United States Patent
He et al.

(10) Patent No.: US 10,650,050 B2
(45) Date of Patent: May 12, 2020

(54) SYNTHESIZING MAPPING RELATIONSHIPS USING TABLE CORPUS

(71) Applicant: Microsoft Technology Licensing, LLC, Redmond, WA (US)

(72) Inventors: Yeye He, Redmond, WA (US); Yue Wang, Hadley, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 279 days.

(21) Appl. No.: 15/480,926

(22) Filed: Apr. 6, 2017

(65) Prior Publication Data

US 2018/0157633 A1 Jun. 7, 2018

Related U.S. Application Data

(60) Provisional application No. 62/430,807, filed on Dec. 6, 2016.

(51) Int. Cl.
*G06F 16/21* (2019.01)
*G06F 16/901* (2019.01)
*G06F 16/28* (2019.01)
*G06F 16/22* (2019.01)

(52) U.S. Cl.
CPC ........ *G06F 16/9024* (2019.01); *G06F 16/217* (2019.01); *G06F 16/2282* (2019.01); *G06F 16/284* (2019.01)

(58) Field of Classification Search
CPC ........ G06F 16/20; G06F 16/217; G06F 16/22; G06F 16/221; G06F 16/2282; G06F 16/28; G06F 16/284–289

USPC .......................................................... 707/602
See application file for complete search history.

(56) References Cited

U.S. PATENT DOCUMENTS

| | | | |
|---|---|---|---|
| 6,611,829 B1 * | 8/2003 | Tate ................... | G06F 16/2462 707/714 |
| 6,957,225 B1 * | 10/2005 | Zait ..................... | G06F 16/2264 |
| 7,756,873 B2 | 7/2010 | Gould et al. | |
| 8,630,989 B2 | 1/2014 | Blohm et al. | |
| 8,914,419 B2 | 12/2014 | Gerard et al. | |
| 2005/0240614 A1 * | 10/2005 | Barsness ............. | G06F 16/2462 |

(Continued)

FOREIGN PATENT DOCUMENTS

CN 105045769 A 11/2015

OTHER PUBLICATIONS

Cafarella, et al., "Uncovering the Relational Web", In Proceedings of the 11th International Workshop on Web and Databases, Jun. 13, 2008, 6 pages.

(Continued)

*Primary Examiner* — Kimberly L Wilson
*Assistant Examiner* — Nirav K Khakhar
(74) *Attorney, Agent, or Firm* — Merchant & Gould

(57) ABSTRACT

Methods and systems for synthesizing mapping tables using table corpus is provided. A functional dependency between at least two items of an input table is determined. A plurality of two-column tables are extracted from the table corpus. The extracted plurality of two-column tables are synthesized to determine at least one mapping table having a first column having the functional dependency with a second column. A next item of the input table is provided from the determined at least one mapping table.

15 Claims, 13 Drawing Sheets

| Ticker | Market Cap |
|---|---|
| GE | 255,888 |
| BB | 212,138 |
| SC | 380,158 |
| PL | 255,888 |
| DI | 94,278 |

Table 5a

| Company | Total '89-13 | Dem | Rep. |
|---|---|---|---|
| Global Electric | $59,456,031 | 41% | 58% |
| Big Box, Inc. | $47,497,295 | 52% | 44% |
| Design, Inc. | $34,216,308 | 35% | 64% |
| Soft, Corp. | $33,910,357 | 48% | 50% |
| Parcel, Ltd. | $33,752,009 | 47% | 51% |

Table 5b

(56) References Cited

U.S. PATENT DOCUMENTS

| | | | |
|---|---|---|---|
| 2005/0240615 A1* | 10/2005 | Barsness | G06F 16/221 |
| 2010/0114902 A1 | 5/2010 | Embley et al. | |
| 2011/0178974 A1* | 7/2011 | Sayal | G06N 5/022 |
| | | | 706/50 |
| 2011/0282861 A1* | 11/2011 | Bergstraesser | G06F 16/24564 |
| | | | 707/710 |
| 2012/0011115 A1 | 1/2012 | Madhavan et al. | |
| 2013/0110788 A1* | 5/2013 | Gong | G06F 16/21 |
| | | | 707/667 |
| 2014/0095542 A1* | 4/2014 | Zelevinsky | G06F 16/26 |
| | | | 707/776 |
| 2014/0172908 A1* | 6/2014 | Konik | G06F 16/951 |
| | | | 707/769 |
| 2015/0066930 A1* | 3/2015 | Tibrewal | G06F 16/285 |
| | | | 707/737 |
| 2015/0178366 A1* | 6/2015 | Farahbod | G06F 16/217 |
| | | | 707/603 |
| 2015/0254530 A1* | 9/2015 | Gulwani | G06F 16/84 |
| | | | 382/187 |
| 2015/0363192 A1* | 12/2015 | Sturtevant | G06F 8/72 |
| | | | 717/131 |
| 2016/0042022 A1* | 2/2016 | Sato | G06F 16/2282 |
| | | | 707/741 |
| 2016/0085835 A1* | 3/2016 | Wong | G06F 16/26 |
| | | | 707/602 |
| 2016/0350369 A1* | 12/2016 | He | G06F 16/24537 |
| 2017/0004157 A1* | 1/2017 | Varadarajan | G06F 16/221 |
| 2017/0083547 A1* | 3/2017 | Tonkin | G06F 16/367 |
| 2017/0116227 A1* | 4/2017 | Shaked | G06F 16/283 |
| 2017/0116228 A1* | 4/2017 | Alberg | G06F 16/211 |
| 2018/0075115 A1* | 3/2018 | Murray | G06F 16/2456 |
| 2018/0137158 A1* | 5/2018 | Hoffmann | G06F 16/2282 |
| 2019/0050437 A1* | 2/2019 | Goyal | G06F 16/2282 |

OTHER PUBLICATIONS

Ananthakrishna, et al., "Eliminating Fuzzy Duplicates in Data Warehouses", In Proceedings of the 28th International conference on Very Large Data Bases, Aug. 20, 2002, 12 pages.

Limaye, et al., "Annotating and Searching Web Tables Using Entities, Types and Relationships", In Proceedings of the VLDB Endowment, vol. 3, No. 1, Sep. 2010, pp. 1338-1347.

Leydesdorff, et al., "Co-occurrence Matrices and their Applications in Information Science: Extending ACA to the Web Environment", In Journal of the American Society for Information Science and Technology, vol. 57, Issue 12, Oct. 2006, 37 pages.

Abedjan, et al., "Dataxformer: Leveraging the web for semantic transformations", In Proceedings of 7th Biennial Conference on Innovative Data Systems Research, Jan. 4, 2015, 13 pages.

Bejerano, et al., "Efficient location area planning for personal communication systems", In Proceedings of IEEE/ACM Transactions on Networking, vol. 14, Issue 2, Apr. 2006, pp. 438-450.

Bollacker, et al., "Freebase: A collaboratively created graph database for structuring human knowledge", In Proceedings of the 2008 ACM SIGMOD international conference on Management of data, Jun. 9, 2008, pp. 1247-1250.

Broder, Andrei Z., "On the resemblance and containment of documents", In Proceedings of the Compression and Complexity of Sequences, Jun. 11, 1997, pp. 1-9.

Cafarella, et al., "Webtables: Exploring the power of tables on the web", In Journal of Proceedings of the VLDB Endowment, vol. 1, Issue 1, Aug. 23, 2008, pp. 538-549.

Chakrabarti, et al., "Data services leveraging bing's data assets", In Journal of Data Engineering, M, pp. 15-28.

Chen, et al., "Ontological pathfinding: Mining first-order knowledge from large knowledge bases", In International conference on Management of Data, Jun. 26, 2016, 12 pages.

Chitnis, et al., "Finding connected components in map-reduce in logarithmic rounds", In Proceedings of the 29th IEEE International Conference on Data Engineering, Apr. 8, 2013, 16 pages.

Chu, et al., "Tegra: Table extraction by global record alignment", In Proceedings of the ACM SIGMOD International conference on Management of Data, May 31, 2015, pp. 1713-1728.

Church, et al., "Word association norms, mutual information, and lexicography", In Journal of Computational Linguistics, vol. 16, Issue 1, Mar. 1, 1990, pp. 22-29.

Cortez, et al., "Annotating database schemas to help enterprise search", In Proceedings of the VLDB Endowment, vol. 8, Issue 12, Aug. 2015, pp. 1936-1939.

Dahlhaus, et al., "The complexity of Multiterminal Cuts", In Journal of Society for Industrial and Applied Mathematics, vol. 23, Issue 4, 1994, pp. 864-894.

Demaine, et al., "Correlation clustering in general weighted graphs", In Journal of Theoretical Computer Science, vol. 361, Issue 2-3, Sep. 1, 2006, pp. 172-187.

Galarraga, et al., "Amie: Association rule mining under incomplete evidence in ontological knowledge bases", In Proceedings of the 22nd international conference on World Wide Web, May 13, 2013, pp. 413-422.

Garg, et al., "Multiway cuts in directed and node weighted graphs", In International Colloquium on Automata, Languages, and Programming, Jul. 11, 1994, 12 pages.

He, et al., "Sema-join: joining semantically-related tables using big table corpora", In Proceedings of the VLDB Endowment—Proceedings of the 41st International Conference on Very Large Data Bases, vol. 8, Issue 12, Aug. 2015, pp. 1358-1369.

Hu, T. C, "Multi-Commodity Network Flows", In Journal of Operations Research, vol. 11, Issue 3, May 1963.

Kimball, et al., "The Data Warehouse Toolkit", In Publication of John Wiley & Sons, Jun. 2013, 601 pages.

Kiveris, et al., "Connected components in mapreduce and beyond", In Proceedings of the ACM Symposium on Cloud Computing, Nov. 3, 2014, pp. 1-13.

Lin, et al., "Identifying functional relations in web text", In Proceedings of the Conference on Empirical Methods in Natural Language Processing, Oct. 9, 2010, pp. 1266-1276.

Ling, et al., "Synthesizing union tables from the web", In Proceedings of the Twenty-Third international joint conference on Artificial Intelligence, Aug. 3, 2013, pp. 2677-2683.

Ritter, et al., "It's a Contradiction—No, it's Not: A Case Study using Functional Relations", In Proceedings of the conference on Empirical Methods in Natural Language Processing, Oct. 2008, 11-20 pages.

Suchanek, et al., "Yago: A core of semantic knowledge", In Proceedings of the 16th international conference on World Wide Web, May 8, 2007, pp. 697-706.

Ukkonen, Esko, "Algorithms for approximate string matching", In Journal of Information and Control, vol. 64, Issues 1-3, Jan. 1985, pp. 100-118.

Vazirani, Vijay V., "Approximation algorithms", In Publication of Springer, 2001, 396 pages.

Venetis, et al., "Recovering semantics of tables on the web", In Journal of Proceedings of the VLDB Endowment, vol. 4 Issue 9, Aug. 29, 2011, pp. 528-538.

Wagner, et al., "The string-to-string correction problem", In Journal of the ACM, vol. 21, Issue 1, Jan. 1974, pp. 168-173.

Yakout, et al., "Entity augmentation and attribute discovery by holistic matching with web tables", In Proceedings of the 2012 ACM SIGMOD International Conference on Management of Data, May 20, 2012, pp. 97-108.

Yannakakis, et al., "Cutting and partitioning a graph after a fixed pattern", In Proceedings of International colloquium on Automata, Languages, and Programming, Jul. 18, 1983.

Hopcroft, et al., "Set merging algorithms", In Journal of vol. 2, No. 4, Dec. 1973, pp. 294-303.

* cited by examiner

| Country | ISO3-Code |
|---|---|
| United States | US |
| Canada | CAN |
| South Korea | KOR |
| Japan | JPN |
| China | CHN |

Table 1a

| Ticker | Company |
|---|---|
| SC | Soft, Corp. |
| DI | Design, Inc. |
| BB | Big Box, Inc. |
| GE | Global Electric |
| PL | Parcels, Ltd. |

Table 1b

| State | Abbreviation |
|---|---|
| Alabama | AL |
| Alaska | AZ |
| Arkansas | AR |
| California | CA |

Table 1c

| Airport Name | IATA |
|---|---|
| Los Angeles International Airport | LAX |
| San Francisco International Airport | SFO |
| Tokyo International Airport | HND |
| London Heathrow Airport | LHR |
| Beijing Capital International Airport | PEK |

Table 1d

FIG. 2

| Model | Make |
|---|---|
| F-150 | Ford |
| Mustang | Ford |
| Accord | Honda |
| Camry | Toyota |
| Charger | Dodge |

Table 2a

| City | State |
|---|---|
| Chicago | Illinois |
| San Francisco | California |
| Los Angeles | California |
| Houston | Texas |
| Seattle | Washington |

Table 2b

FIG. 3

| ID | Employee | Residence State |
|---|---|---|
| 2910 | Doe, John | California |
| 1923 | Smith, P. | Washington |
| 1928 | Williams, D. | Oregon |
| 2491 | Jones, N. | CA |
| 4850 | Wilson, A. | WA |

Table 3

FIG. 4

| City | State |
|---|---|
| San Francisco | California |
| Seattle | Washington |
| Los Angeles | California |
| Houston | Texas |
| Denver | Colorado |

Table 4

FIG. 5

| Ticker | Market Cap |
|---|---|
| GE | 255,888 |
| BB | 212,138 |
| SC | 380,158 |
| PL | 255,888 |
| DI | 94,278 |

Table 5a

| Company | Total '89-13 | Dem | Rep. |
|---|---|---|---|
| Global Electric | $59,456,031 | 41% | 58% |
| Big Box, Inc. | $47,497,295 | 52% | 44% |
| Design, Inc. | $34,216,308 | 35% | 64% |
| Soft, Corp. | $33,910,357 | 48% | 50% |
| Parcel, Ltd. | $33,752,009 | 47% | 51% |

Table 5b

FIG. 6

| Country | Code |
|---|---|
| Korea (Republic) | KOR |
| Korea (South) | KOR |
| KOREA REPUBLIC OF | KOR |
| Korea, Republic of | KOR |
| Korea, Republic of (South Korea) | KOR |
| Korea, South | KOR |
| Republic of Korea | KOR |
| South Korea | KOR |

Table 6a

| Country | Code |
|---|---|
| Congo (Democratic Rep.) | COD |
| Congo (Demographic Republic of) | COD |
| Congo, Democratic Republic of the | COD |
| CONGO, DEMOCRATIC REPUBLIC OF (WAS ZAIRE) | COD |
| Congo, Democratic Republic of the (Congo & Kinshasa) | COD |
| Congo, The Democratic Republic of | COD |
| CONGO, THE DRC | COD |
| Democratic Republic of Congo | COD |

Table 6b

FIG. 7

| Home Team | Away Team | Date | Stadium | Location |
|---|---|---|---|---|
| Chicago Bears | Greenbay Packers | 10-12 | Soldier Field | Chicago, IL 60605 |
| Detroit Lions | Minnesota Vikings | 10-12 | Ford Field | Detroit, MI |
| Detroit Lions | Greenbay Packers | 10-19 | Ford Field | Detroit, MI |
| Minnesota Vikings | Chicago Bears | 10-19 | US Bank Stadium | Minneapolis |
| Greenbay Packers | Minnesota Vikings | 10-26 | Lambeau Field | 1265 Lombardi Ave |

Table 7

FIG. 9

| Country | IOC | FIFA | ISO |
|---|---|---|---|
| Afghanistan | AFG | AFG | AFG |
| Albania | ALB | ALB | ALB |
| Algeria | ALG | ALG | DZA |
| American Samoa[1] | ASA | ASA | ASM |
| Andorra | AND | AND | AND |
| Angola | ANG | ANG | AGO |
| Antigua and Barbuda | ANT | ATG | ATG |
| Argentina | ARG | ARG | ARG |
| Armenia | ARM | ARM | ARM |
| Aruba | ARU | ARU | ABW |

Table 8

FIG. 10A

| Country | IOC |
|---|---|
| Afghanistan | AFG |
| Albania | ALB |
| Algeria | ALG |
| American Samoa | ASA |
| South Korea | KOR |
| US Virgin Islands | ISV |

Table 9(a)

| Country | IOC |
|---|---|
| Afghanistan | AFG |
| Albania | ALB |
| Algeria | ALG |
| American Samoa (US) | ASA |
| Korea, Republic of (South) | KOR |
| Virgin Islands, United States | ISV |

Table 9(b)

| Country | ISO |
|---|---|
| Afghanistan | AFG |
| Albania | ALB |
| Algeria | DZA |
| American Samoa | ASM |
| South Korea | KOR |
| US Virgin Islands | VIR |

Table 9(c)

---
Algorithm 1: Candiate Extraction
---
Input: Table corpus $\mathcal{T}$
Output: Candidate two-column table set $\mathcal{B}$ 1  $\mathcal{B} \Leftarrow \emptyset$
2  foreach $T \in \mathcal{T}$ do
3     $T' \Leftarrow \emptyset$
4     foreach $C_i \in T$ do
5        if $C_i$ *is not removed by PMI filter* then
6           $T' \Leftarrow T' \cup \{C_i\}$ 7     foreach $C_i, C_j \in T'$ $(i \neq j)$ do
8        $B \Leftarrow (C_i, C_j)$
9        if $B$ *is not removed by FD filter* then
10          $\mathcal{B} \Leftarrow \mathcal{B} \cup \{B\}$

FIG. 12A

Algorithm 2: Conflict Resolution

Input: Partition $P = \{B_1, B_2, ...\}$
Output: $P_T$ without conflict

1  $P_T \Leftarrow P$
2  while $\exists B_i, B_j \in P_T, \text{conflict}(B_i, B_j) > 0$ do
3      $InstSet \Leftarrow \bigcup_{B_i \in P_T} B_i$
4      foreach $(v_1, v_2) \in InstSet$ do
5          $cnt_I(v_1, v_2) \Leftarrow \#$ conflicting instances in $InstSet$
6      foreach $B_i \in P_T$ do
7          $cnt_B(B_i) \Leftarrow \max_{(v_1, v_2) \in B_i} cnt_I(v_1, v_2)$
8      $B_i \Leftarrow \arg\max_{B_i \in P_T} cnt_B(B_i)$
9      $P_T \Leftarrow P_T \setminus \{B_i\}$

FIG. 12B

Algorithm 3: Table-Synthesis by Partitioning

Input: Graph $G = (\mathcal{B}, E)$, threshold $\tau$
Output: Set of Partitions $\mathcal{P}$ 1. $P(B_i) \Leftarrow \{B_i\}, \forall B_i \in \mathcal{B}$
2. $\mathcal{B}_P \Leftarrow \bigcup_{B_i \in \mathcal{B}} \{P(B_i)\}$
3. $E_P \Leftarrow \bigcup_{(B_i, B_j) \in E} \{(P(B_i), P(B_j))\}$
4. $w_P^+(P(B_i), P(B_j)) \Leftarrow w^+(B_i, B_j)$
5. $w_P^-(P(B_i), P(B_j)) \Leftarrow w^-(B_i, B_j)$
6. $G_P \Leftarrow (\mathcal{B}_P, E_P)$
7. while *true* do
8.     $e(P_1, P_2) \Leftarrow \underset{P_1 \neq P_2, w_P^-(P_1, P_2) \geq \tau}{arg\,max} (w_P^+(P_1, P_2))$
9.     if $e = NULL$ then
10.         break
11.     $P' \Leftarrow P_1 \cup P_2$
12.     Add $P'$ and related edges into $\mathcal{B}_P$ and $E_P$
13.     foreach $P_i \notin \{P_1, P_2\}$ do
14.         $w_P^+(P_i, P') \Leftarrow w_P^+(P', P_i) \Leftarrow w_P^+(P_i, P_1) + w_P^+(P_i, P_2)$
15.         $w_P^-(P_i, P') \Leftarrow w_P^-(P', P_i) \Leftarrow \min\{w_P^-(P_i, P_1), w_P^-(P_i, P_2)\}$
16.     Remove $P_1, P_2$ and related edges from $\mathcal{B}_P$ and $E_P$
17. $\mathcal{P} \Leftarrow \mathcal{B}_P$

FIG. 12C

SYNTHESIZING MAPPING RELATIONSHIPS USING TABLE CORPUS

RELATED APPLICATION

This application claims benefit of U.S. Provisional Patent Application No. 62/430,807 titled "SYNTHESIZING MAPPING RELATIONSHIPS USING TABLE CORPUS" filed on Dec. 6, 2016, the entirety of which is hereby incorporated by reference.

BACKGROUND

Mapping relationships, such as (country, country-code) or (company, stock-ticker), are valuable data assets for an array of applications in data cleaning and data integration like auto-correction and auto-join. However, today there are no good repositories of mapping tables that can enable these intelligent applications. Given a corpus of tables such as web tables or spreadsheet tables, values of these mappings often exist in pairs of columns in same tables. However, synthesizing mapping relationships using a large table corpus can be difficult and time-consuming. It is with respect to these and other considerations that the present disclosure is presented.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Methods and systems for synthesizing mapping tables using a corpus of tables is provided. A functional dependency between at least two items of an input table is determined. A plurality of two-column tables is extracted from a corpus of tables. At least one mapping table having a first column having the functional dependency with a second column is determined from the plurality of two-column tables. A next item of the input table is provided from the determined at least one mapping table.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 2 illustrates example one-to-one mapping tables;

FIG. 3 illustrates example many-to-one mapping tables;

FIG. 4 illustrates example table with data inconsistency;

FIG. 5 illustrates an example mapping table;

FIG. 6 illustrates example input tables;

FIG. 7 illustrates example extracted column pairs;

FIG. 9 illustrates an example table of corpus of tables;

FIG. 10A illustrate another example table of corpus of tables;

FIG. 10B illustrate examples of column pairs extracted from corpus of tables;

FIG. 12A illustrates an algorithm for candidate column pair extraction;

FIG. 12B illustrates an algorithm for approximate string matching for extracted column pairs;

FIG. 12C illustrates an algorithm for mapping table synthesis by partitioning;

DETAILED DESCRIPTION

Figure 1:
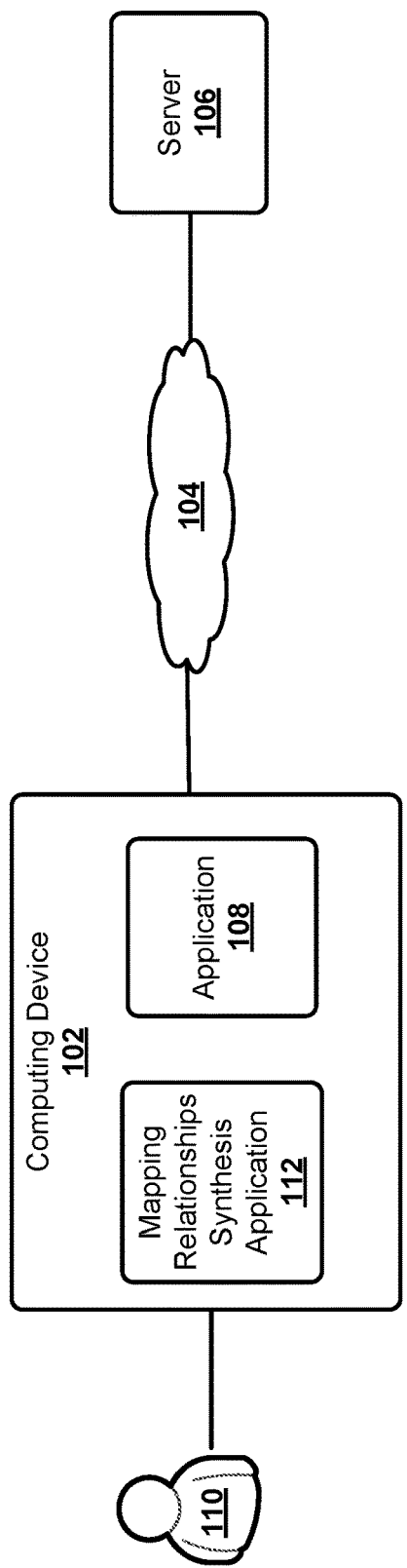
FIG. 1 is a block diagram showing an example operating environment including components of a system for synthesizing mapping tables.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects are directed to synthesizing mapping tables from a corpus of tables. A list of two-column tables (also referred to as column pairs) is extracted from the corpus of tables. The extracted column pairs are then pruned to remove non-functional and non-coherent column pairs from the list. The pruned list is then synthesized to determine mapping tables. For example, pruned list is synthesized to determine column pairs that describe a same relationship and are compatible with each other. A conflict resolution is then performed on the synthesized column pairs to remove column pairs having erroneous or conflicting values. The synthesized column pairs then may be provided as mapping tables after the conflict resolution.

With reference now to FIG. 1, a block diagram of an example operating environment 100 illustrating aspects of an example system for synthesizing mapping tables is shown. The example operating environment 100 includes an electronic computing device 102. Computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications 108. The hardware of these computing devices is discussed in greater detail in regard to FIGS. 13, 14A, 14B, and 15.

A user 110 may utilize an application 108 on computing device 102 for a variety of tasks, which may include, for example, to write, calculate, draw, take and organize notes, organize, prepare presentations, send and receive electronic mail, make music, and the like. Examples of suitable application 108 include, but are not limited to, word processing applications, spreadsheet applications, slide presentation applications, electronic mail applications, drawing applications, note-taking applications, web browser applications, and game applications. Application 108 may include thick client application 108, which are stored locally on the computing device 102, or may include thin client application 108 (i.e., web applications) that reside on a remote server and accessible over a network. A thin client application 108 may be hosted in a browser-controlled environment or coded in a browser-supported language and reliant on a common web browser to render the application 108 executable on the computing device 102.

According to an aspect, application 108 is operative to communicate with a server computing device 106 over a network 104, such as the Internet or an intranet. As understood by those skilled in the art, a variety of software applications 108, databases and/or functionalities and data may be stored and/or operated at server 106 and may be accessed by computing device 102.

In one aspect, computing device 102 may include a mapping relationships synthesis application (MRSA) 112. MRSA 112 may be a software module, an application or a device operative to perform the auto-join functionality described herein. For example, MRSA 112 may be an intelligent data quality agent. MRSA 112 may be operated as part of application 108 for performing auto-provide operations with respect to data operated by or accessed by application 108. Alternatively, MRSA 112 functionality may be operated as a standalone software module, application or device at computing device 102 accessible by application 108. Alternatively, MRSA 112 functionality may be operated at server 106 accessible by application 108 or by other applications that are operative to access functionality at server 106. MRSA 112 may include thick client application, which are stored locally on the computing device 102, or may include thin client application (i.e., web applications) that reside on a remote server and accessible over a network.

In one aspect, MRSA 112 synthesizes corpus of tables to determine mapping tables having direct relationships between its columns. Mapping tables, also referred to as bridge tables, are two-column tables where each distinct value in the left-hand-side column maps to a unique value in the right-hand-side column. That is, mapping tables include a functional dependency between the two columns. Mapping tables may include one-to-one mapping relationships or one-to-many mapping relationships.

FIG. 2 illustrates a few example mapping tables with one-to-one mapping relationships. For example, Table 1(a) of FIG. 2 provides an example one-to-one mapping table of Countries to its assigned international organization for standardization (ISO) codes. Table 1(b) of FIG. 2 provides an example one-to-one mapping of company names to its assigned stock-tickers. Table 1(c) of FIG. 2 provides example one-to-one mapping table of State names to its abbreviations. Table 1(d) of FIG. 2 provides example one-to-one mapping table of airports to its international airport transport association (IATA) codes. Such one-to-one mapping tables may be available as standalone tables or extracted from complex tables. In one aspect, such mapping tables may be synthesized by MRSA 112 and stored either at computing device 102 or server 106.

FIG. 3 shows example mapping tables with many-to-one mappings. For example, Table 2(a) of FIG. 3 provides an example of many-to-one mapping table for car makes and models. Similarly, Table 2(b) of FIG. 3 provides an example of many-to-one mapping table for cities and states. Mapping tables, such as one-to-one mapping tables and one-to-many mapping tables, are important data assets for a variety of applications such as data integration and data cleaning. In one aspect, such one-to-many mapping tables may be available as standalone tables or extracted from complex tables. For example, such many-to-one mapping tables may be synthesized by MRSA 112 and stored either at computing device 102 or server 106.

In one aspect, mapping tables may be synthesized by MRSA 112 and stored either at computing device 102 or server 106 may be used in variety of different ways. For example, mapping tables, such as one-to-one mapping tables of FIG. 2, may be used for auto-correction. For example, an input table may contain inconsistent values in one or more columns. Table 3 of FIG. 4 shows an example of such input table. As shown in FIG. 4, values under the Residence State column of Table 3 are mixed with both full State names and State abbreviations. MRSA 112, equipped with the mapping table in Table 1(c), may easily detect and alert user 110 of such inconsistencies. For example, MRSA 112 may notice values under Residence State column of Table 3 are mixed between full names and abbreviations. Furthermore, MRSA 112 may automatically suggest corrections based on the mapping relationship. For example, MRSA 112 may automatically suggest correcting CA to California or correcting Oregon to OR.

In one example aspect, the correction suggestions may be based on a first value of the input table. For example, because a first value for Residence State column in Table 3 is full state name, MRSA 112 may provide suggestions that the other values for Residence State column should contain full state name as well. In another example aspect, the correction suggestions may be based on a popularity of the values in the column. For example, because full State name is used three times for Residence State column in Table 3 and shortened abbreviation is used only twice, hence MRSA 112 may suggest changing shortened abbreviations to full state name.

In another example aspect, mapping tables, such as one-to-one mapping tables of FIG. 1, may be used for providing auto-fill suggestions. An example of the auto-fill operation using the mapping tables in shown in FIG. 5. For example, when user 110 has a list of City names and she wants to add a column of State names corresponding to the City names. MRSA 112 may automatically populate values for the State names based on mappings from Table 2(b) of FIG. 3. For example, when user 110 enters a first value, such as California for San Francisco, MRSA 112 may automatically detect the intent by matching existing value pairs with those in Table 2(b), and suggest to automatically auto-fill remaining values. That is MRSA 112 may auto-fill Washington for Seattle, California for Los Angeles, Texas for Houston, and Denver for Colorado, in the States name column as shown in Table 4 of FIG. 5.

In another example aspect, mapping tables, such as one-to-one mapping tables of FIG. 1, may be used for auto-joining two columns. For example, in data integration and ad-hoc data analysis, user 110 often needs to join two tables together whose subject columns may have different representations. For example, and as shown in FIG. 6, user 110 needs to join the left table (Table 5(a)) that has stocks by their market capitalization with the right table (Table 5(b)) that lists companies by their political contributions, to analyze potential correlations that may exist. MRSA 112 may auto join Table 5(a) and Table 5(b) based on mapping relationships from Table 1(b) of FIG. 2. However a direct join is not possible since the subject column of the left table includes stock tickers, while the right table includes company names. MRSA 112 equipped with mapping tables would make the join possible by using Table 1(b) as an intermediate bridge that enables a three-way join to connect these two user tables, without requiring user 110 to find mappings to enable such a join by themselves.

In one aspect, beyond these three examples, MRSA 112 may provide synthesized mapping tables that enable solutions that provide inspectable and verifiable results. Such results are efficient and easy to scale to large problems as described further below. Since mapping tables have applications beyond these three examples, they are really versatile data assets with the advantage of being amenable to human feedback and curation for continuous improvements (amortized over multiple applications).

In an example aspect, table corpus such as hypertext markup language (HTML) tables from Web or spreadsheets from Enterprise, useful mapping relationships are often well-represented. For example, the country and country ISO code columns in Table 1(a) of FIG. 2 are often adjacent columns in same tables on the Web. However, it is not easy to generate mapping relationships from a big table corpus. The difficulties are threefold.

A first kind of difficulty is in incompleteness. Tables from a table corpus typically only cover a small fraction of mappings in the same relationship. For example, while there may be thousands of airports, a Web table like in Table 1(d) of often only lists a small fraction of popular airports. It is thus necessary to stitch together tables that are in the same relationship for completeness.

The second kind of difficulty is in form of synonymous mentions. Each individual table from a table corpus typically lists one mention for the same entity. For example, Table 1(a) of FIG. 2 lists South Korea and KOR. In reality different tables with the same relationship use different but synonymous names. Table 6(a) of FIG. 7 shows example value pairs synthesized from real Web tables where different synonyms of South Korea, collected from many different tables, all map to the same code KOR. Since these synonymous values may also be used in applications like auto-join and auto-fill, for better coverage it is again necessary to synthesize values from different tables to produce expanded mappings like Tables 6(a) and 6(b).

A third kind of difficulty is in form of spurious mappings. Certain mappings that appear to hold locally within some tables in the corpus may not be globally meaningful. For example, a random table listing departure airport and arrival airport may have values between the two columns appear to follow functional dependencies at the instance level. However, at the conceptual level there are no consistent mappings between pairs of airports, and such a mapping would be spurious. This requires us to perform a global analysis of tables in the corpus to reliably identify useful mapping relationships.

According to aspects, given that mapping relationships are often well-represented in tables, a mapping relationship from a table corpus, such as enterprise spreadsheets in enterprise domain, are derived. The mapping relationships are automatically synthesized using the table corpus. For example, an optimization problem that incorporates statistical compatibility between tables and constraints such as functional dependencies as are required for mapping tables is provided. A trichotomy of complexity for the resulting optimizing problem is generated and an efficient algorithm is developed for the general case that can scale to large table corpus.

In one example aspect, synthesized mapping tables contain a mapping relationship between columns. The mapping relationships are binary relationships involving two attributes. The binary relationships may include a functional dependency (FD) between the two attributes. Examples of mapping relationships include (country→country-code) and (company→stock-ticker) as shown in Table 1(a) and Table 1(b) respectively. There is a mapping relationship between attributes Country and country-code, for instance, since value in one attribute is uniquely associated with precisely one value in another attribute. The mapping relationships may be bi-directional, such as the mapping relationships shown in Table 1(a) of FIG. 2, or unidirectional. In one aspect, if R is a binary relation with two attributes X, Y, the mapping relationship is denoted by M(X, Y) or X→Y, if each value in x∈X functionally determines one and precisely one value in y∈Y. For cases where both X→Y and Y→X are mapping relationships, such bi-directional relationships 1:1 mappings. If the mapping relationship only holds in one direction, then it is an N:1 mapping such as mapping relationships shown in Tables 2(a) and 2(b) of FIG. 3.

In one aspect, because of name ambiguity, functional dependency in some mappings may appear to only hold approximately. For example, city→state is conceptually a mapping relationship. However, when entities are represented as strings, the functional relationship may not completely hold. For example, there is a city called Portland in the state of Oregon and another city Portland in the state of Maine, thus giving the appearance of violating functional relationship. This is mainly because of ambiguous names. In one aspect, such ambiguity is taken into account and is considered relationships whose surface forms are approximate mapping relationships.

Figure 8:
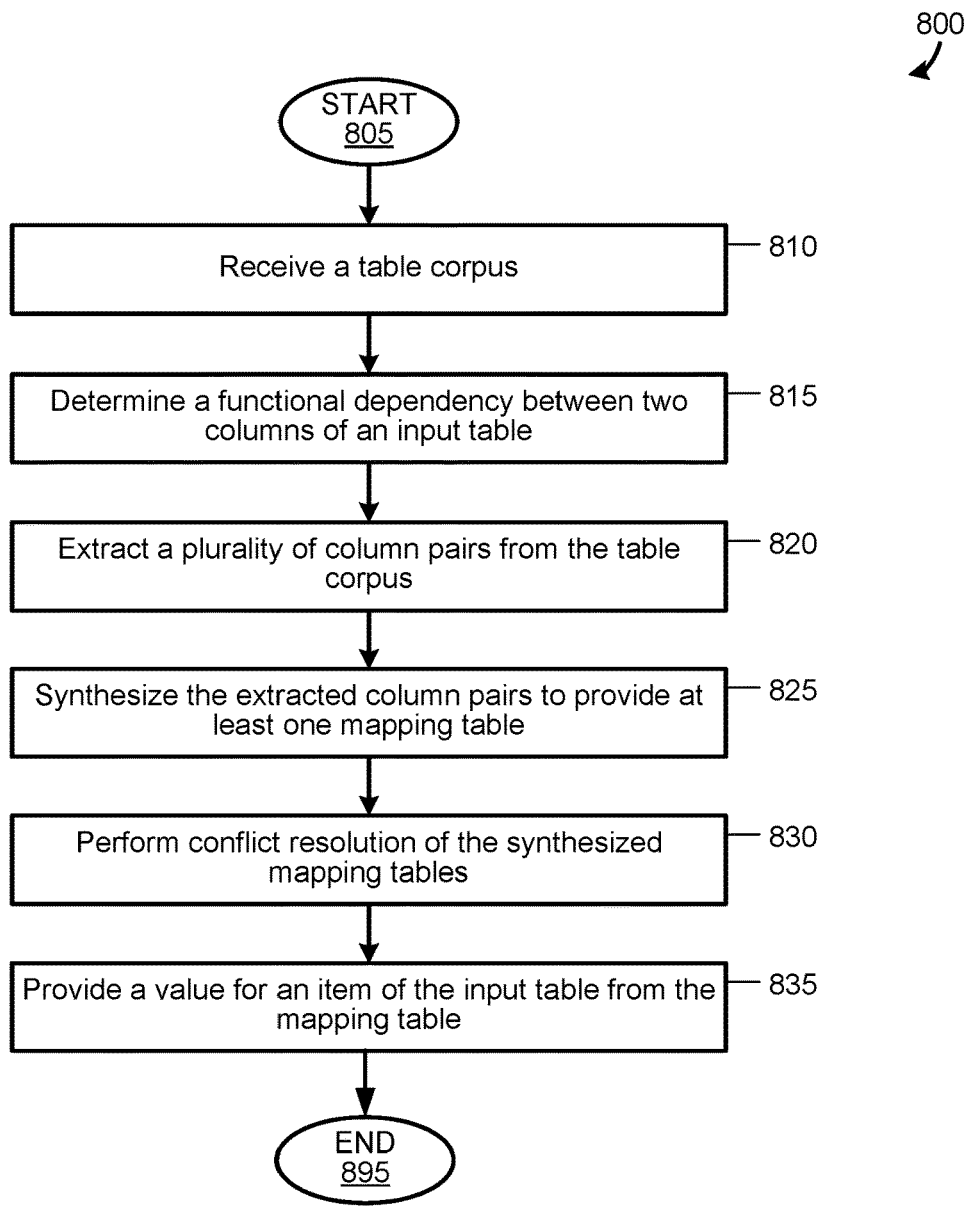
FIG. 8 is a flow chart showing general stages involved in an example method for synthesizing mapping tables.

FIG. 8 is a flow chart showing general stages involved in an example method 800 for synthesizing mapping relationships. Method 800 begins at START OPERATION 805 and proceeds to OPERATION 810, where a table corpus is received. A table corpus T={T} is a set of relational tables T, each of which consists of a set of columns. In one aspect, the table corpus may be indicated as T={$C_1$, $C_2$, . . . }. As discussed previously, the table corpus may be received from the Web or enterprises. In one example aspect, the table corpus is received by MRSA 112. Example of a corpus table is illustrated in FIG. 9 as Table 7 and in FIG. 10A as Table 8.

In one aspect, the table corpus is received from the Web. For example, MRSA 112 may crawl the Web to determine the table corpus. In another aspect, the table corpus is received from enterprises or organizations. For example, MRSA 112 may receive the table corpus from a corporation, such as financial data. In one aspect, the received table corpus may be stored on computing device 102 or server 106.

After receiving the table corpus at OPERATION 810, method 800 proceeds to OPERATION 815, where a functional dependency between two columns of an input table is determined. For example, user 110 may be attempting to create a table mapping Cities to States as shown in Table 4 of FIG. 5. MRSA 112 may determine a functional dependency between two columns of this input table, such as city→state. In one example aspect, the functional dependency is automatically determined based on analysis of existing items of the input table. In another example aspect, the functional dependency is dynamically determined based on analysis of items being entered by user 110 in the input table. In yet another example aspect, the functional dependency is provided by user 110.

After determining the functional dependency at OPERATION 815, method 800 proceeds to OPERATION 820, where a plurality of column pairs are extracted from the corpus of tables. For each table $T=\{C_1, C2, \ldots C_n\}$ with n columns, $$2\binom{n}{2}$$

such ordered pairs are extracted. For example, for Table 7 of FIG. 9, method 800 may extract pairs of columns such as (Home Team, Away Team), (Home Team, Date), (Home Team, Stadium), (Home Team, Location), etc. However, not all extracted column pairs are good candidate for mapping relationships. For example, for some column pairs if the relationship between columns is not functional locally, then they are unlikely to participate in true mappings. Similarly, some column pairs are low quality and are not coherent enough. In an example embodiment, the extracted column pairs are filtered to narrow the candidates for determining the mapping relationships. For example, the Location column of Table 7 is mixed with city-state-zip, city-state, city only, and address line. Such incoherent columns may be excluded from consideration for mapping table synthesis. For example, non-functional in-coherent column pairs may be filtered. The filtering may be a coherence based column filtering using point wise mutual information or a column pair filtering based on a local functional dependency. In one aspect, MRSA 112 is configured to extract and filter the column pairs. An example heuristic algorithm 1210 for extracting and filtering the column pairs is illustrated as Algorithm 1 in FIG. 12A.

After candidate extraction at OPERATION 820, method 800 proceeds to OPERATION 825, where the extracted column pairs are synthesized to provide at least one mapping table. For example, the extracted column pairs are synthesized to determine two-column tables that describe the same relationship and are compatible with each other. The synthesized two-column tables provide better coverage of instances such as synonyms and values scattered across different tables. For instance, many web tables and spreadsheets are for human consumption, and as a result tend to be short with only subset of instances. Also, each table in most cases only mentions an entity by one name. Hence, synthesis may improve coverage of synonyms that are important for many applications. In one aspect, MRSA 112 synthesizes the extracted two-column tables to determine the at least one mapping table.

After synthesizing the extracted column pairs at OPERATION 825, method 800 proceeds to OPERATION 830, where a conflict resolution is performed for the synthesized mapping tables. For example, because table synthesis pieces together many tables, some of which may have erroneous values inconsistent with others. For example, synthesized mapping tables may include two pairs of values in the same mapping with the same left-hand-side value but different right-hand-side thus violating the definition of mappings. These conflicts may happen due to quality issues or extraction errors. In one aspect, MRSA 112 resolves these conflicts in synthesized mapping tables.

After producing the mapping tables at OPERATION 830, method 800 proceeds to OPERATION 835, wherein a value for an item of the input table is provided from the synthesized mapping tables. For example, MRSA 112 determines a next item being entered in a first column of the input table and determines a synthesized mapping table having that item. From the determined synthesized mapping table, MRSA 112 determines a corresponding value for the second column. In another aspect, MRSA 112 may determine whether the corresponding value entered in the second column is accurate based on looking up into the synthesized mapping tables. After providing the corresponding value at OPERATION 835, method 800 stops at END OPERATION 895.

In one aspect, MRSA 112 may filter extracted column pairs from the table corpus. For example, MRSA 112 may filter incoherent column pairs using pointwise mutual information (PMI). For PMI filtering, MRSA 112 measures a coherence score of a table column based on semantic coherence between pairs of values. MRSA 112 may apply a data-driven approach to define coherence based on co-occurrence statistics in a corpus. For example, MRSA 112 may define s(u, v) as coherence between two values u and v, $C(u)=\{C|u \in C_1\ C \in T_1\ T \in T\}$ as columns in the corpus T containing value u, and $C(v)=\{C|v \in C_2\ C \in T_1\ T \in T\}$ as columns in the corpus T containing value v. If $C(u) \cap C(v)$ is a large set, it means u and v are co-occurring frequently (e.g., u=USA and v=Canada), they intuitively are highly related and thus MRSA 112 assigns a high semantic coherence score. Conversely, if $C(u) \cap C(v)$ is a small set (e.g., u=USA and v=Greenbay Packers, which rarely co-occur), then the two values are semantically incompatible and MRSA 112 assign a low coherence.

MRSA 112 may use the PMI to quantify the strength of co-occurrence as a proxy for coherence. For example, the PMI for two values u and v may be provided as:

$$PMI(u, v) = \log\frac{p(u, v)}{p(u)p(v)} \quad (1)$$

where p(u) and p(v) are the probabilities of seeing u and v from a total of N columns in a table corpus T. The probabilities p(u), p(v), and p(u, v) from of Equation (1) may be determined as:

$$p(u) = \frac{|C(u)|}{N}$$

$$p(v) = \frac{|C(v)|}{N}$$

$$p(u, v) = \frac{|C(u) \cap C(v)|}{N}$$

For example, u is USA and v is Canada, and there are total of 100M columns (N=100M). Individually, the two strings occur 1000 times (|C(u)|=1000) and 500 (|C(v)|=1000) times respectively and together they co-occur 300 times (|C(u)∩C(v)|=300). Then PMI (u, v), using equation (1) may be determined to be 4.77. PMI (u, v)=4.77 greater than 0 may suggest that USA and Canada have high co-occurrence and strong semantic coherence.

In one aspect, MRSA 112 may define coherence of two values, denoted by s(u, v), as a normalized version of PMI, also referred to as Normalized PMI (NPMI). NPMI may have a range of between negative one to one, that is [−1, 1]. In one aspect NPMI for two values u and v may be provided as:

$$s(u, v) = NPMI(u, v) = \frac{PMI(u, v)}{-\log p(u, v)} \quad (2)$$

In one aspect, using s(u, v), the coherence score of a column C={$v_1, v_2, \ldots$}, denoted as S(C), can be determined as the average of all pair-wise coherence scores between values. For example, S(C) may be determined as:

$$S(C) = \frac{\sum_{v_i, v_j \in C, i<j} s(v_i, v_j)}{\binom{|C|}{2}} \quad (3)$$

Hence, MRSA 112 can then filter out a column C if its coherence S(C) is lower than a threshold, indicating that values in the column are not semantically compatible, and are probably of low quality, and are inappropriate for mapping synthesis. For example, column coherence computed using NPMI in Equation (3) for Table 7 of FIG. 9 may reveal that the first four columns all have high coherence scores, because values in these columns co-occur often in the table corpus. The location column, however, have low coherence values/scores, because values in this column are mixed and do not co-occur often enough in other columns. Hence, MRSA 112 may remove the location column when generating column pairs for Table 7. In one aspect, in determining the NPMI for a column, MRSA 112 may replace numbers with wild cards symbols such as '\digit' to improve effectiveness of co-occurrence computation. In another aspect, MRSA 112 may also filter out columns whose values are very long. For example, MRSA 112 may remove columns with textual information ill-suited as mapping relationships.

In one aspect, after removing individual columns with low coherence scores, MRSA 112 may use the resulting table T={$C_1, C_2, \ldots C_n$} to generate binary tables with ordered column pairs B(T)={$(C_i, C_j) | i, j \in [n], i \neq j$} as candidate tables. However, most of these two-column tables may not have meaningful mapping relationships, such as (Home Team, Away Team), and (Home Team, Date) in Table 7. This quadratic increase in number of tables may cause efficiency as well as quality issues.

Since MRSA 112 is configured to produce mapping relationships satisfying functional dependency (FD), MRSA 112 may apply local FD checking to prune away column pairs unlikely to be mappings. For example, after pruning of location column from Table 7 based on coherence scores, there are four columns that remain. The four remaining columns may produce a total of twelve $$\left(2\binom{4}{2} = 12\right)$$

ordered column pairs. Among these candidates, pairs such as (Home Team, Away Team), and (Home Team, Date) do not satisfy the FD constraint. Only two out of these twelve column pairs satisfy FD, namely, (Home Team, Stadium), and (Stadium, Home Team). MRSA 112 may remove column pairs unlikely to be mappings. In one aspect, instead of using all possible column pairs, MRSA 112 may only consider column pairs involving a subject-column and other columns to the right.

In one aspect, column pairs extracted from the table corpus are synthesized based on compatibility between the tables. For example, MRSA 112 may determine a positive evidence for compatibility between the extracted column pairs. For example, for two binary relationships (B={$(l_i, r_i)$} and B'={$(l'_i, r'_i)$}) produced during the extraction of the column pairs, each with sets of (left, right) value pairs, if these two relations share many common value pairs, or |B∩B'| is large, they are likely in the same relationship and compatible for synthesis. Thus if, $w^+$(B, B') is a positive compatibility between column pairs B and B', MRSA 112 may use set-based similarity to quantify compatibility based on the overlap |B∩B'|.

In one aspect, MRSA 112 may determine a set-based similarity using Jaccard Similarity metrics or containment metrics. For example, MRSA 112 may use a symmetric variant of Jaccard Containment metrics, also referred to as Maximum-of-Containment for w+(B, B'). MRSA 112 may determine the positive compatibility between column pairs B and B', using the Jaccard Containment metrics, as:

$$w^+(B, B') = \max\left\{\frac{|B \cap B'|}{|B|}, \frac{|B \cap B'|}{|B'|}\right\} \quad (4)$$

For example, FIG. 10B illustrates three column pairs extracted from Table 8 of FIG. 10A as candidate tables. The candidate tables include Table 9(a) or $B_1$, Table 9(b) or $B_2$ and Table 9(c) or $B_3$. B1 is a two-column binary table of Countries and IOC codes; B2 is a two-column binary table of Countries and FIFA codes; and B3 is a two-column binary table of Countries and ISO codes. As illustrated in FIGS. 10A and 10B, some countries, for FIFA codes, use alternative synonyms compared to IOC codes. In addition, and as shown in FIGS. 10A and 10B, the ISO code for some countries can be different from the IOC codes and FIFA codes.

Using Equation (4), MRSA 112 may determine the positive compatibility between each pair of tables. For example, the positive compatibility may be provided as $w^+$($B_1$, $B_2$)=max{3/6,3/6}=0.5. Because |$B_1$∩$B_2$|=3 (the first three rows), suggesting that the two tables share a significant fraction of mappings and are likely to be compatible for synthesis.

In one aspect, although the compatibility scores may be determined for all pairs of candidate tables, in reality most tables share no common values, and may have a compatibility score of zero. For example, Table 1(a) of FIG. 2 is about country codes and Table 1(b) FIG. 2 is about stock tickers, with no overlaps at all. So both their positive and negative weights are zero. Hence, for N total candidate tables, MRSA 112 may need to perform O($N^2$) comparison. However, in one aspect, MRSA 112 may use an inverted-index-style value indexing to reduce the compatibility score determination. For example, MRSA 112 may restrict the compatibility score to be only computed within clusters of candidate tables that share at least some common value-pairs. MRSA 112 may inspect the index to find out which candidate tables share same instances or values. MRSA 112 then evaluates $w^+(B, B')$ if and only if B and B' share more than $\theta_{overlap}$ instances (i.e. both left and right values). Similarly, MRSA 112 evaluates $w^-(B, B')$ if and only if B and B' share more than $\theta_{overlap}$ left values. Use of the inverted-index-style value may dramatically reduce the complexity and makes scaling to hundreds of millions of tables possible.

In one aspect, MRSA 112 may implement string matching to determine the compatibility score. In some corpus tables, values from different tables often have slight variations, such as "Korea, Republic of" and "Korea Republic"; or "American Samoa" and "American Samoa (US)". In some corpus tables, there is other extraneous information in table cells, such as the footnote mark "[1]" after the value "American Samoa" in the fourth row of Table 8 in FIG. 10A. These variations make positive compatibility between tables artificially low.

To account for such minor syntactic variations, MRSA 112 may use approximate string matching between values. Specifically, MRSA 112 may measure an edit distance, denoted as $d_{ed}(v_1, v_2)$, between a pair of values $v_1$ and $v_2$. MRSA 112 may treat $v_1$ and $v_2$ as a match if $d_{ed}(v_1, v_2)$ is smaller than a threshold $\theta_{ed}$. MRSA 112 may also use a fractional distance threshold, defined as $\min\{\lfloor |v_1| \cdot f_{ed} \rfloor, \lfloor |v_2| \cdot f_{ed} \rfloor\}$, which is dynamically determined based on the length of string $|v_1|$, $|v_2|$, and a fixed fractional value $f_{ed}$ (e.g., 0.2). The fractional distance is chosen instead of an absolute distance because a desired threshold often change based on the length of values. For example, for short values such as "USA" (for United States of America) or "RSA" (for South Africa), any absolute distance threshold greater than 1 would incorrectly predict the two as a match. Fractional threshold on the other hand may require an exact match in this case. MRSA 112 may further restrict the threshold to be within some fixed threshold $k_{ed}$ to safeguard false positives. Combining, MRSA 112 may use $\theta_{ed}(v_1, v_2) = \min\{\lfloor |v_1| f_{ed} \rfloor, \lfloor |v_2| f_{ed} \rfloor, k_{ed}\}$.

For example, and as illustrated in FIG. 10A, Table 8 includes mappings of country names and three types of country codes: IOC, FIFA, and ISO. The three columns for country codes have identical codes for many countries, but can also be different for many others. All of these country codes are valid mappings but are for two different country-code standards. When using approximate matching for positive compatibility, w+(B1, B2) may be updated to $$\max\left\{\frac{4}{6}, \frac{4}{6}\right\} = 0.67.$$

This is because in addition to the first three rows that match perfectly between $B_1$ and $B_2$, now the fourth row "American Samoa" and "American Samoa (US)" may also be considered as a match, as the edit distance between the two values is 2 (ignoring punctuations), which is no greater than the defined threshold $\theta_{ed} = \min\{\lfloor 13 \cdot 0.2 \rfloor, \lfloor 15 \cdot 0.2 \rfloor, 10\} = 2$.

In one aspect, table corpus may result in millions of table pairs for which MRSA 112 may need to compute compatibility. For example, if m is an average number of values in a table, then for each table pair, MRSA 112 may need to make roughly $O(m^2)$ approximate string comparisons, each of which is of complexity $\theta(|v_1||v_2|)$ when using dynamic programming. This determination may be too expensive. In one aspect MRSA 112 may optimize the efficiency using Ukkonen's algorithm to scale this determination. For example, MRSA 112 may use Ukkonen's algorithm to bring the time complexity down to $O(k_{ed} \cdot \min\{|v_1|, |v_2|\})$, by determining only the diagonals of the edit distance matrix. Since $k_{ed}$ is a small constant independent of $|v_1|$ or $|v_2|$ the time complexity may be linear to $|v_1|$ and $|v_2|$.

In some column pairs, synonyms of entity names may be available. For example, if MRSA 112 knows for instance, "US Virgin Islands" and "United States Virgin Islands" are synonyms from external sources, it may boost positive compatibility between $B_1$ and $B_2$ in Table 8 of FIG. 10A accordingly.

In one aspect, positive compatibility alone may often not be sufficient to fully capture compatibility relationships between column pairs, as the column pairs of different relationships may sometimes have substantial overlaps. For example, the positive compatibility between $B_1$ and $B_3$ is $$\max\left\{\frac{3}{6}, \frac{3}{6}\right\} = 0.5$$

(the first, second and fifth rows match). Given the high score, Tables 9(a) and 9(c) will likely merge incorrectly as one is for IOC code while the other is for ISO code. This issue may exist in general when one of the column is short and ambiguous (e.g. codes), or when one of the tables has mixed mappings. In such cases, these two tables may actually also contain conflicting value pairs, such as the third and fourth row in the example above where the two tables have the same left-hand-side value, but different right-hand-side values. These conflicts may violate the definition of mapping relationship, and is a clear indication that the two tables are not compatible, despite their positive scores.

In one aspect, MRSA 112 may determine a negative incompatibility between column pairs to avoid merging of conflicting column pairs. For negative compatibility determination for two column pairs B and B', their conflict set may be defined as $F(B, B')=\{l|(l, r)\in B, (l, r')\in B', r\neq r'\}$, or the set of values that share the same left-hand-side but not the right-hand-side. For example, between column pairs $B_1$ and $B_3$ of FIG. 10B, (Algeria, ALG) and (Algeria, DZA) is a conflict. To model the (symmetric) incompatibility between two tables B and B', MRSA 112 may define a negative incompatibility score $w^-(B, B')$ similar to the positive compatibility in Equation (4). For example, the negative incompatibility may be determined as:

$$w^-(B, B') = -\max\left\{\frac{|F(B, B')|}{|B|}, \frac{|F(B, B')|}{B'}\right\} \quad (5)$$

As discussed previously, the positive compatibility between column pairs $B_1$ and $B_3$ may be determined as $$\max\left\{\frac{3}{6}, \frac{3}{6}\right\} = 0.5,$$

which is substantial and may lead to incorrect merges between two different relationships (IOC and ISO). Using negative compatibility, MRSA 112 may compute $w^-(B_1, B_3)$ as $$-\max\left\{\frac{3}{6}, \frac{3}{6}\right\} = -0.5,$$

since the third, the forth and the sixth row conflict between the two tables, and both tables have six rows. The negative compatibility score of 0.5 may suggest that column pairs $B_1$ and $B_3$ have substantial conflicts, indicating that a merge will be unsuitable.

In comparison, for column pairs $B_1$ and $B_2$ of FIG. 10B, which include the same relationships of IOC, the negative compatibility score is empty and $w^-(B_1, B_2)=0$, indicating that MRSA 112 does not have negative evidence to suggest that Tables 9(a) and 9(b) are incompatible.

In one aspect, after determining the positive compatibility score and negative compatibility score (also referred to as incompatibility score), MRSA 112 may perform problem formulation for mapping synthesis. For example, MRSA 112 may use a graph $G=\{B, E\}$ to model candidate tables and their relationships, where B is union of all binary tables, that is, extracted column pairs. In graph G, each vertex may represent a table $B \in B$. Furthermore, for each pairs of vertices B, $B' \in B$, MRSA 112 may use compatibility scores $w^+(B, B')$ and incompatibility scores $w^-(B, B')$ positive and negative edge weights on the graph.

Figure 11:
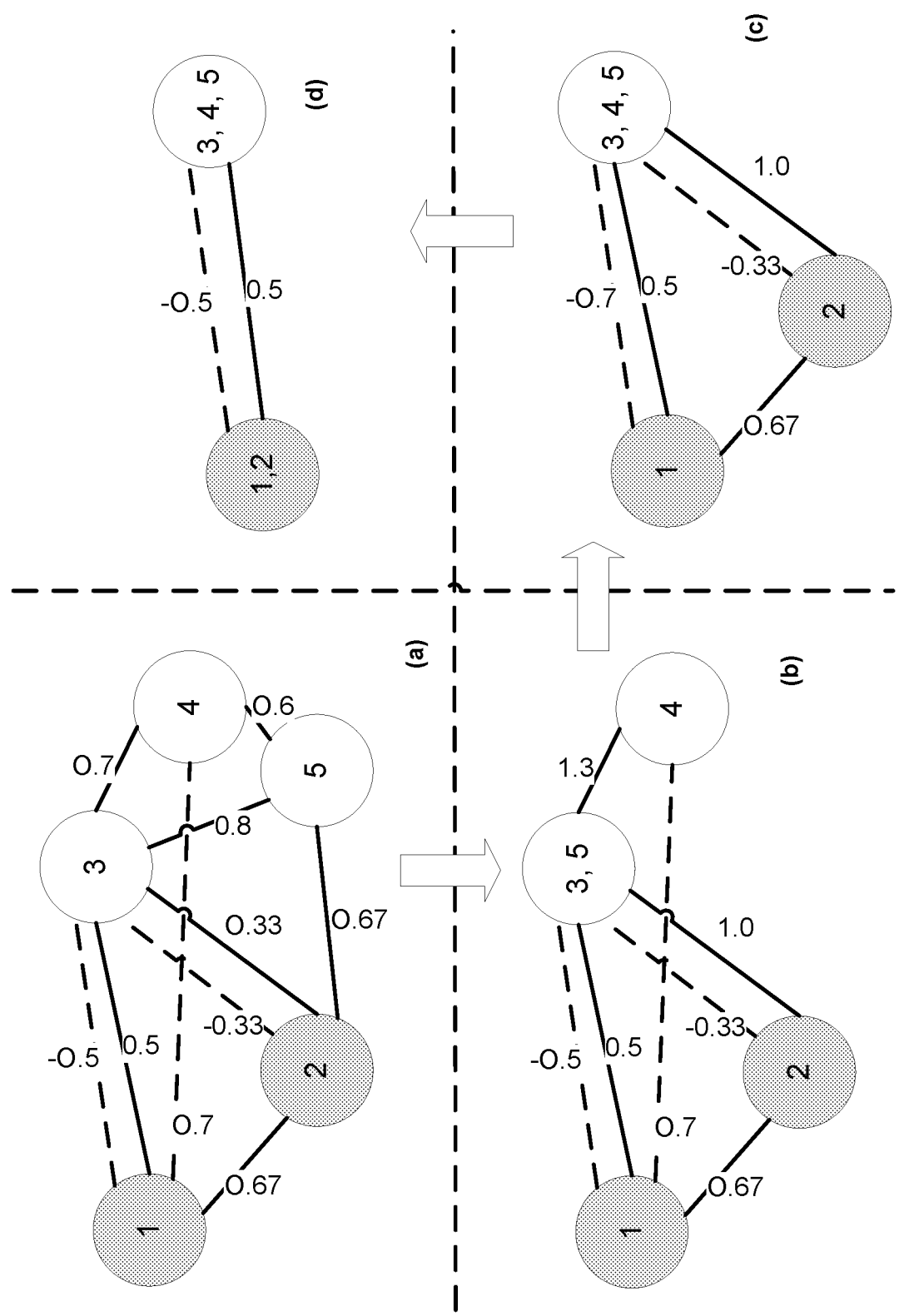
FIG. 11 illustrates a graph representation of the extracted column pairs.

For example, FIG. 11 illustrates graph representations of candidate Tables 9(a), 9(b), and 9(c) of FIG. 10B. More specifically, FIG. 11 illustrates compatibility relationships between Tables 9(a), 9(b), and 9(c). In graph representation of FIG. 11, solid vertices represent tables for ISO codes and hollow vertices represent tables for IOC codes. Furthermore, in graph representation of FIG. 11, solid edges indicate positive compatibility while dashed edges indicates negative incompatibility. Edges with zero weights are omitted on the graph. For example, the positive compatibility $w^+(B_1, B_2)=0.67$, is shown as solid edge with positive weight in FIG. 11. Similarly, negative edge weights like $w^-(B_1, B_3)=-0.5$ is shown as dashed edge in FIG. 11. In addition, edge with a weight of 0, such as $w^-(B_1, B_2)$, is omitted in FIG. 11.

In one aspect, MRSA 112, in the context of graph G, may group compatible vertices/tables together. Grouping of compatible tables in the graph may correspond to a partitioning $P=\{P_1, P_2, \ldots\}$ of B, where each $P_i \subset B$ represents a subset of tables that can be synthesized into one relationship. Since different partitions correspond to distinct relationships, the partitioning may be disjoint ($P_i \cap P_j = \emptyset$, $i \neq j$), and they may collectively cover B, or $\cup_{P \in P} P = B$. An example algorithm 1230 for table-synthesis by partitioning is shown in FIG. 12C.

In one aspect, there may be other ways to partition B disjointly. In another aspect, MRSA 112 may determine a partitioning that has the following desirable properties: (1) compatible tables are grouped together as much as possible to improve coverage of individual clusters; and (2) incompatible tables should not be placed in the same partition. These requirements may be translated into an optimization problem. For example, first, MRSA 112 may assign to each partition P to have as many compatible tables as possible. If $w^+(P)$ is a sum of positive compatibility in a partition P, then $w^+(P)$ may be determined as:

$$w^+(P) = \sum_{B_i, B_j \in P, i<j} w^+(B_i, B_j)$$

Maximizing the sum positive compatibility score across all partitions, or $\Sigma_{P \in P} w^+(P)$ may be an optimization objective.

In one aspect, MRSA 112 may not put incompatible tables with non-trivial $w^-$ scores, such as Tables 9(a) and 9(c), in a same partition. For example, MRSA 112 may use negative $w^-$ scores as hard-constraints to our optimization. Thus MRSA 112 may ensure that it do not over-penalize tables with slight inconsistency on the right-hand-side due to minor quality and extraction issues. So here MRSA 112 may ignore edges with insignificant negative scores $w^-$ above a threshold $\tau$ (e.g., −0.2), by essentially forcing them to zero. For example, if $w^-(P)$ may be the sum of substantial negative weights in P, $w^-(P)$ may be determined as:

$$w^-(P) = \sum_{B_i, B_j \in P, w^-(B_i, B_j) < \tau} w^-(B_i, B_j)$$

MRSA 112 may use $w^-(P)$ as a constraint of the formulation to remove edges in the same partition that have substantial conflicts, or, $w^-(P)=0$, $\forall P \in P$.

Putting these together, MRSA 112 may formulate the table synthesis as an optimization problem as follows.

$$\max \Sigma_{P \in P} w^+(P) \quad (6)$$

$$\text{s.t.} \Sigma_{P \in P} w^-(P)=0 \quad (7)$$

$$P_i \cap P_j = \emptyset, \forall P_i \neq P_j \quad (8)$$

$$\cup_{P \in P} P = B \quad (9)$$

By placing compatible tables in the same partition, MRSA 112 may score more in the objective function in Equation (6), but at the same time Equation (7) may provide that no conflicting negative edge can be in the same partition. Equations (8) and (9) may be used to ensure that partition P is a proper disjoint partitioning.

In one aspect, using the formulation above, a best partitioning for Table 8 of FIG. 10A, may be determined as $\{\{B_1, B_2\}, \{B_3, B_4, B_5\}\}$, which groups two ISO tables and three IOC tables into separate partitions. This partitioning has a total compatibility score of 2.77 based on Equation (6), without violating negative compatibility constraints in Equation (7) by not placing negative edges in the same partition. As illustrated in the graph representation in FIG. 11, solid vertices on the left represent tables for ISO codes and hollow vertices on the right represent tables for IOC codes. Furthermore, solid edges indicate positive compatibility, while dashed edges indicate negative incompatibility.

In one aspect, the optimization problem may have a computation complexity of non-deterministic polynomial acceptable (NP) problems. In another aspect, there exists a trichotomy result in terms of complexity. For example, if a graph has exactly one negative edge, the optimization problem is equivalent to min-cut, max-flow because MRSA 112 may make a pair of vertices incident to the negative edge as source and sink, respectively. When the graph has two negative edges, the optimization problem may be solved in a polynomial time. In the more general case, when there are no less than three negative edges, the optimization problem may become a NP-hard.

In one aspect, despite the NP hardness, there is a O(log N)-approximation algorithm for the loss-minimization version the optimization problem. For example, the loss-minimization version of the optimization problem may be written as follows, which minimize the positive edge weights that are lost as a result of the partitions created to disconnect all the negative edges.

$$\min \Sigma_{B \in P_i, B' \in P_j, i \neq j} w^+(B, B') \quad (10)$$

$$\text{s.t.} \Sigma_{P \in P} w^-(P)=0 \quad (11)$$

$$Pi \cap Pj = \emptyset, \forall Pi \neq Pj \quad (12)$$

$$\cup_{P \in \mathcal{P}} P = B \quad (13)$$

Using standard embedding techniques, MRSA 112 may encode partition decisions using distance variables $d_{ij}$, namely, $d_{ij}=0$ if vertices $B_i$ and $B_j$ are in the same partition, and $d_{ij}=1$ if they are in different partitions. The embedding technique may produce the following formulation:

$$\min \Sigma w^+(B_i, B_j) \cdot d_{ij}$$

$$s.t. d_{ij} + d_{jk} \geq d_{ik}, \forall i,j,k \quad (14)$$

$$d_{ij} = d_{ij} \in \{0,1\} \quad (15)$$

$$d_{ij} = 1, \forall w^-(B_i, B_j) < \tau \quad (16)$$

The computing complexity of the embedded optimization problem provided by Equations (14), (15), and (16) may be reduced to approximable NP-problem complexity (or APX-hard). Using additional techniques including linear programming (LP) relaxation technique and region-growing for randomized rounding technique, MRSA 112 may produce an O(log N) approximation for the embedded optimization problem. In one aspect, such an approximation scheme may require MRSA 112 to model each pair of vertices as a decision variable $d_{ij}$, and then solve the associated LP before applying randomized rounding. For example. MRSA 112 may determine a solution for each $x_{i,j} \in [0, 1]$ and then approximate them to $\{0, 1\}$.

In one aspect, MRSA 112 may use a heuristic algorithm to perform the partitioning. An example heuristic algorithm 1230 for greedy partitioning is illustrated as Algorithm 3 in FIG. 12C. In shown in the heuristic algorithm 1230, MRSA 112 may initially treat each vertex as a partition and build a new graph of partitions. MRSA 112 then may iteratively find a pair of partitions ($P_1, P_2$) that are the most compatible, and merge them to get a new partition P', while updating the remaining positive/negative edges. The heuristic algorithm 1230 terminates when no partitions can be merged.

In one aspect, while the procedure outlined in the heuristic algorithm 1230 may appear straightforward for graphs that fit in a single machine, in the optimization problem, such as one provided by equations (14), (15), and (16), graphs have millions of vertices, which have to be handled by distributed programming environment like Map-Reduce. Scaling this iterative method in such a setting is not straightforward. MRSA 112 uses a divide-and-conquer approach to first produce components that are connected non-trivially by positive edges on the full graph, and then look at each subgraph individually. For example, MRSA 112 may carve the graph by removing all edges whose positive weight is less than a threshold. Then MRSA 112 may find connected components of this new graph, may solve equations (14), (15), and (16) on each independent component as a subgraph.

In one aspect, MRSA 112 may use the Hash-to-Min algorithm to compute connected components on Map-Reduce. The Hash-to-Min algorithm may treat every vertex and its neighbors as a cluster initially. Then for each cluster, it may send a message of a cluster ID to all its members. Next every vertex chooses a minimum cluster ID it receives and propagate this minimum ID as a new ID of all the other clusters who sends message to it. The Hash-to-Min algorithm iteratively applies the above steps until convergence. Now given a subgraph, MRSA 112 may apply heuristic algorithm 1230 to solve equations (14), (15), and (16). Since, set union and lookup are two frequent operations in heuristic algorithm 1230, MRSA 112 may use a disjoint-set data structure to speed up the process.

For example, FIG. 11 illustrates an operation of heuristic algorithm 1230 for a small graph. The heuristic algorithm 1230 first merges $\{B_3\}$ and $\{B_5\}$ from stage (a) to get stage (b) because Edge ($\{B_3\}, \{B_5\}$) has the greatest weight. The weight of Edge ($\{B_2\}, \{B_3, B_5\}$) changes as $w^+(\{B_2\}, \{B_3, B_5\}) \Leftarrow w^+(\{B_2\}, \{B_3\}) + w^+(\{B_2\}, \{B_5\})$. The weight of Edge ($\{B^4\}, \{B_3, B_5\}$) also changes similarly. The heuristic algorithm 1230 then merges $\{B_3, B_5\}$ and $\{B_4\}$ from stage (b) to get stage (c). Heuristic algorithm 1230 finally combines $\{B_1\}$ and $\{B_2\}$ from Stage (c) to get stage (d). Heuristic algorithm 1230 then stops because of the negative weight between $\{B_1, B_2\}$ and $\{B_3, B_4, B_5\}$.

In one aspect, the synthesized tables may have conflicts that require post-processing. For example, when MRSA 112 takes union all tables in the same partition together, there may be a small fraction of rows that share the same left-hand-side value, but have different right-hand-side values. Because MRSA 112 allows some degree of inconsistency when merging tables, these conflicts may propagate to the final synthesized table. MRSA 112 may resolve conflicts by removing a least number of low-quality tables, such that the partition will have no conflicts.

For example, P is a partition with candidate tables $\{B_1, B_2, \ldots\}$, each of which is a set of instances $B_i = \{(l, r)\}$, and a conflict set F(B, B') is defined to be $\{l | (l, r) \in B, (l, r') \in B', r \neq r'\}$. MRSA 112 may leverage known synonyms, and not treat (l, r), (l, r') as conflicts if (r, r') are known to be synonyms. MRSA 112 may determine a largest subset $P_T \subseteq$ such that no two tables in $P_T$ conflict with each other. In one aspect, MRSA 112 may determine the conflict set as:

$$\max \left| \bigcup_{B_i \in P_T} B_i \right| F(B_i, B_j) = \emptyset, \forall B_i, B_j \in P_T \quad (16)$$

The objective is to include as many instances as possible, under the constraint that no tables in the selected subset $P_T$ have conflict.

In one aspect, the conflict resolution computation complexity is of NP-hard. An algorithm, that is algorithm 1220, for performing conflict resolution is shown in FIG. 12B. Algorithm 1220 as shown in FIG. 12B may iteratively find and remove an instance that conflicts with the most other instances and removes its candidate. In one aspect, a user may be configured to inspect and curate synthesized results mapping tables. In another aspect, the synthesized mapping tables have a natural notion of importance as well as popularity.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 13:
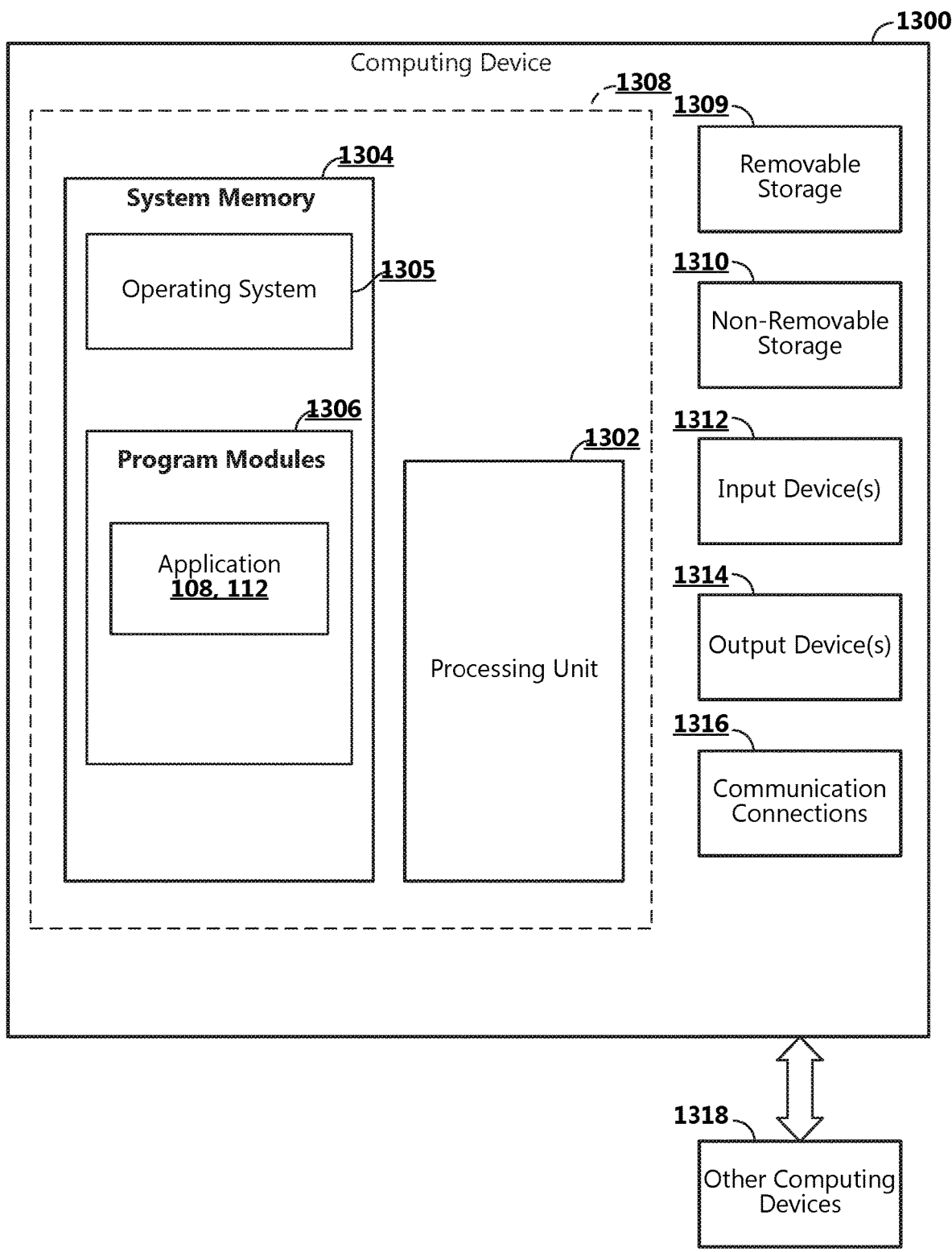
FIG. 13 is a block diagram illustrating example physical components of a computing device.
Figure 14A:
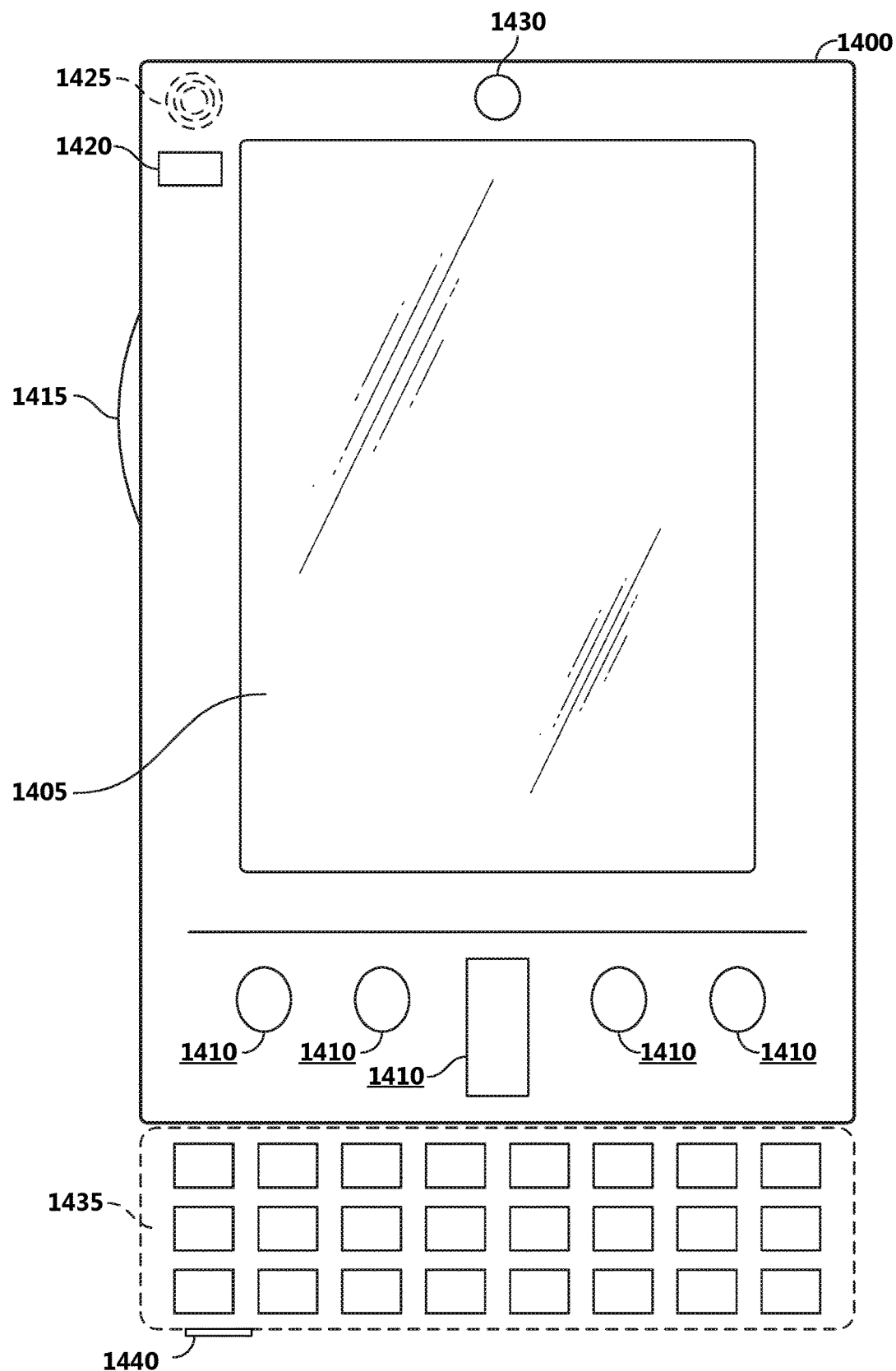
FIGS. 14A and 14B are simplified block diagrams of a mobile computing device.
Figure 14B:
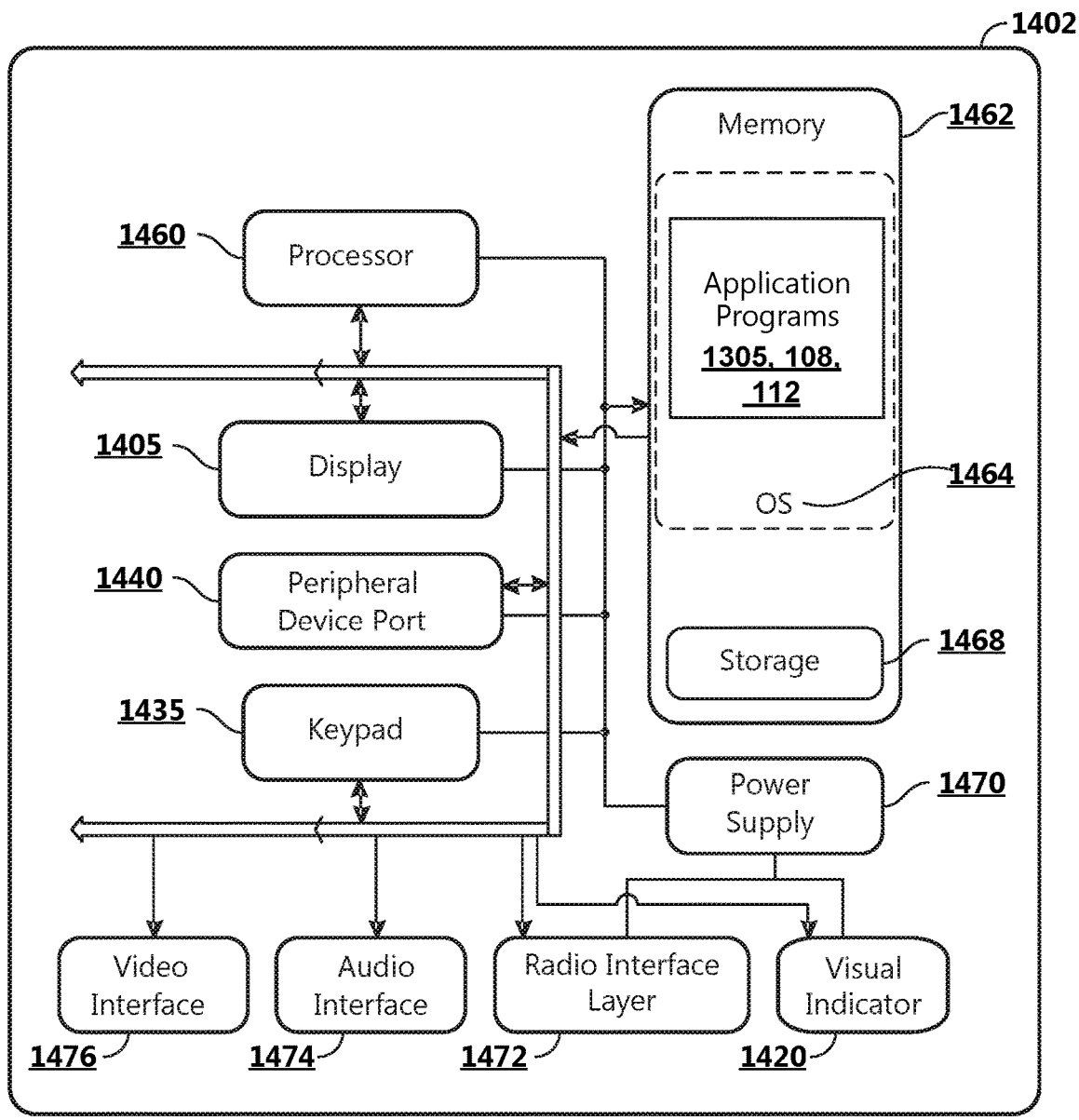
Figure 15:
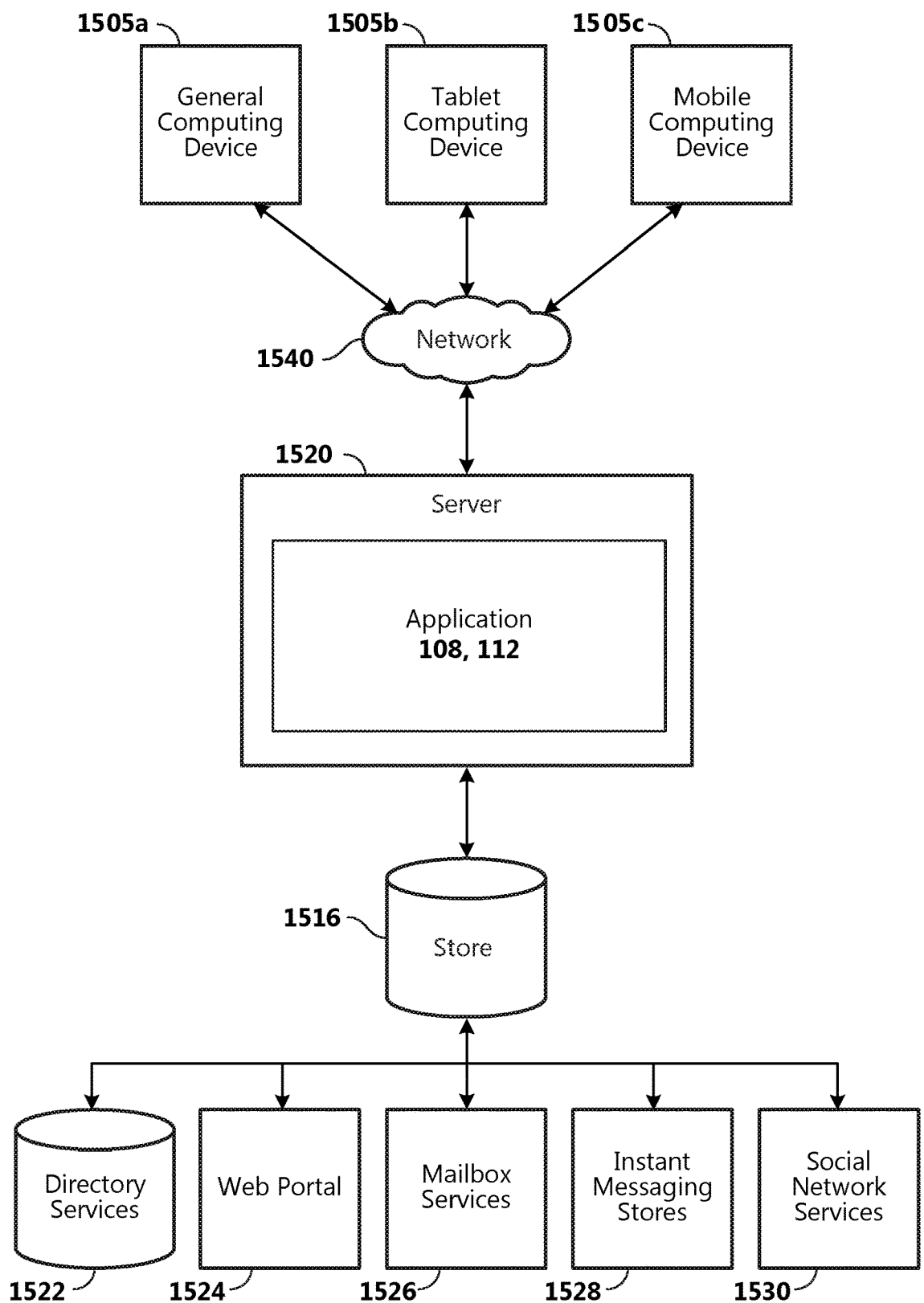
FIG. 15 is a simplified block diagram of a distributed computing system.

FIGS. 13-15 and the associated descriptions provide a discussion of a variety of operating environments in which examples are practiced. However, the devices and systems illustrated and discussed with respect to FIGS. 13-15 are for purposes of example and illustration and are not limiting of a vast number of computing device configurations that are utilized for practicing aspects, described herein.

FIG. 13 is a block diagram illustrating physical components (i.e., hardware) of a computing device 1300 with which examples of the present disclosure may be practiced. In a basic configuration, computing device 1300 includes at least one processing unit 1302 and a system memory 1304. According to an aspect, depending on the configuration and type of computing device, system memory 1304 comprises, but is not limited to, volatile storage (e.g., random access memory), non-volatile storage (e.g., read-only memory), flash memory, or any combination of such memories. According to an aspect, system memory 1304 includes an operating system 1305 and one or more program modules 1306 suitable for running software applications 1350. According to an aspect, system memory 1304 includes the mapping relationships synthesis application 112. Operating system 1305, for example, is suitable for controlling the operation of the computing device 1300. Furthermore, aspects are practiced in conjunction with a graphics library, other operating systems, or any other application program, and are not limited to any particular application or system. This basic configuration is illustrated in FIG. 13 by those components within a dashed line 1308. According to an aspect, computing device 1300 has additional features or functionality. For example, according to an aspect, computing device 1300 includes additional data storage devices (removable and/or non-removable) such as, for example, magnetic disks, optical disks, or tape. Such additional storage is illustrated in FIG. 13 by a removable storage device 1309 and a non-removable storage device 1310.

As stated above, according to an aspect, a number of program modules and data files are stored in the system memory 1304. While executing on processing unit 1302, program modules 1306 (e.g., MRSA 112) perform processes including, but not limited to, one or more of the stages of the method 800 illustrated in FIG. 8. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 13 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 1200 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, computing device 1300 has one or more input device(s) 1312 such as a keyboard, a mouse, a pen, a sound input device, a touch input device, etc. Output device(s) 1314 such as a display, speakers, a printer, etc. are also included according to an aspect. The aforementioned devices are examples and others may be used. According to an aspect, computing device 1300 includes one or more communication connections 1316 allowing communications with other computing devices 1318. Examples of suitable communication connections 1316 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. System memory 1304, removable storage device 1309, and non-removable storage device 1310 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1300. According to an aspect, any such computer storage media is part of the computing device 1300. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 14A and 14B illustrate a mobile computing device 1400, for example, a mobile telephone, a smart phone, a tablet personal computer, a laptop computer, and the like, with which aspects may be practiced. With reference to FIG. 14A, an example of a mobile computing device 1400 for implementing the aspects is illustrated. In a basic configuration, mobile computing device 1400 is a handheld computer having both input elements and output elements. Mobile computing device 1400 typically includes a display 14305 and one or more input buttons 1410 that allow the user to enter information into mobile computing device 1400. According to an aspect, display 1405 of mobile computing device 1400 functions as an input device (e.g., a touch screen display). If included, an optional side input element 1415 allows further user input. According to an aspect, side input element 1415 is a rotary switch, a button, or any other type of manual input element. In alternative examples, mobile computing device 1400 incorporates more or less input elements. For example, the display 1405 may not be a touch screen in some examples. In alternative examples, mobile computing device 1400 is a portable phone system, such as a cellular phone. According to an aspect, mobile computing device 1400 includes an optional keypad 1435. According to an aspect, optional keypad 1435 is a physical keypad. According to another aspect, optional keypad 1435 is a "soft" keypad generated on the touch screen display. In various aspects, the output elements include display 1405 for showing a graphical user interface (GUI), a visual indicator 1420 (e.g., a light emitting diode), and/or an audio transducer 1425 (e.g., a speaker). In some examples, mobile computing device 1400 incorporates a vibration transducer for providing the user with tactile feedback. In yet another example, mobile computing device 1400 incorporates input and/or output ports, such as an audio input (e.g., a microphone jack), an audio output (e.g., a headphone jack), and a video output (e.g., a HDMI port) for sending signals to or receiving signals from an external device. In yet another example, mobile computing device 1400 incorporates peripheral device port 1440, such as an audio input (e.g., a microphone jack), an audio output (e.g., a headphone jack), and a video output (e.g., a HDMI port) for sending signals to or receiving signals from an external device.

FIG. 14B is a block diagram illustrating the architecture of one example of a mobile computing device. That is, the mobile computing device 1400 incorporates a system (i.e., an architecture) 1402 to implement some examples. In one example, system 1402 is implemented as a "smart phone" capable of running one or more applications (e.g., browser, e-mail, calendaring, contact managers, messaging clients, games, and media clients/players). In some examples, system 1402 is integrated as a computing device, such as an integrated personal digital assistant (PDA) and wireless phone.

According to an aspect, one or more application programs 1450 are loaded into memory 1462 and run on or in association with the operating system 1464. Examples of the application programs include phone dialer programs, e-mail programs, personal information management (PIM) programs, word processing programs, spreadsheet programs, Internet browser programs, messaging programs, and so forth. According to an aspect, application 108 is loaded into memory 1462. System 1402 also includes a non-volatile storage area 1468 within memory 1462. Non-volatile storage area 1468 is used to store persistent information that should not be lost if system 1402 is powered down. Application programs 1450 may use and store information in non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into memory 1462 and run on mobile computing device 1400.

According to an aspect, system 1402 has a power supply 1470, which is implemented as one or more batteries. According to an aspect, power supply 1470 further includes an external power source, such as an AC adapter or a powered docking cradle that supplements or recharges the batteries.

According to an aspect, the system 1402 includes a radio 1472 that performs the function of transmitting and receiving radio frequency communications. The radio 1472 facilitates wireless connectivity between system 1402 and the "outside world," via a communications carrier or service provider. Transmissions to and from the radio 1472 are conducted under control of the operating system 1464. In other words, communications received by radio 1472 may be disseminated to application programs 1450 via operating system 1464, and vice versa.

According to an aspect, visual indicator 1420 is used to provide visual notifications and/or an audio interface 1474 is used for producing audible notifications via audio transducer 1425. In the illustrated example, visual indicator 1420 is a light emitting diode (LED) and the audio transducer 1425 is a speaker. These devices may be directly coupled to the power supply 1470 so that when activated, they remain on for a duration dictated by the notification mechanism even though processor 1460 and other components might shut down for conserving battery power. The LED may be programmed to remain on indefinitely until the user takes action to indicate the powered-on status of the device. Audio interface 1474 is used to provide audible signals to and receive audible signals from the user. For example, in addition to being coupled to audio transducer 1425, audio interface 1474 may also be coupled to a microphone to receive audible input, such as to facilitate a telephone conversation. According to an aspect, system 1402 further includes a video interface 1476 that enables an operation of an on-board camera 1430 to record still images, video stream, and the like.

According to an aspect, mobile computing device 1400 implementing the system 1402 has additional features or functionality. For example, the mobile computing device 1400 includes additional data storage devices (removable and/or non-removable) such as, magnetic disks, optical disks, or tape. Such additional storage is illustrated in FIG. 14B by non-volatile storage area 1468.

According to an aspect, data/information generated or captured by mobile computing device 1400 and stored via system 1402 is stored locally on mobile computing device 1400, as described above. According to another aspect, the data is stored on any number of storage media that is accessible by the device via radio 1472 or via a wired connection between mobile computing device 1400 and a separate computing device associated with mobile computing device 1400, for example, a server computer in a distributed computing network, such as the Internet. As should be appreciated such data/information is accessible via mobile computing device 1400 via radio 1472 or via a distributed computing network. Similarly, according to an aspect, such data/information is readily transferred between computing devices for storage and use according to well-known data/information transfer and storage means, including electronic mail and collaborative data/information sharing systems.

FIG. 15 illustrates one example of the architecture of a system for synthesizing mapping tables as described above. Content developed, interacted with, or edited in association with MRSA 112 is enabled to be stored in different communication channels or other storage types. For example, various documents may be stored using a directory service 1522, a web portal 1524, a mailbox service 1526, an instant messaging store 1528, or a social networking site 1530. MRSA 112 is operative to use any of these types of systems or the like for providing a personalized persistent collection of customized inking tools, as described herein. According to an aspect, a server 1520 provides application 108 to clients 1405a,b,c. As one example, server 1520 is a web server providing application 108 and related functionality and content over the web. Server 1520 provides application 108 and related functionality and over the web to clients 1505 through a network 1540. By way of example, the client computing device is implemented and embodied in a personal computer 1505a, a tablet computing device 1505b or a mobile computing device 1505c (e.g., a smart phone), or other computing device. Any of these examples of the client computing device are operable to obtain content from store 1516.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for synthesizing mapping relationships using a table corpus, comprising:
   a processor; and
   a memory storage device including instructions that when executed by the processor are operable to:
   extract a table from a corpus of tables, the table including a plurality of columns;
   remove a column comprising incoherent values from the plurality of columns;
   generate column pairs from remaining columns, the generated column pairs having a binary relationship between a first column of the generated column pair and a second column of the generated column pair;
   remove each of the generated column pairs that has a binary relationship lacking a functional dependency; and
   synthesize remaining generated column pairs to determine at least one mapping table, the at least one mapping table comprising a first column having the functional dependency with a second column.

2. The system of claim 1, wherein to remove the column comprising the incoherent values from the plurality of columns, the instructions that when executed by the processor are further operable to:
   determine a coherence score for each column of the plurality of columns; and
   remove the column having the coherence score less than a predetermined threshold from the plurality of columns.

3. The system of claim 1, wherein to synthesize the remaining generated column pairs, the instructions that when executed by the processor are further operable to:
   determine a compatibility score between each column pair of the remaining generated column pairs; and
   merge a first column pair of the remaining generated column pairs based on the determined compatibility score.

4. The system of claim 3, wherein the instructions that when executed by the processor are operable to determine a positive compatibility score and a negative compatibility score between each column pair of the remaining generated column pairs.

5. A method for synthesizing mapping relationships using a table corpus, comprising:
   extracting a table from a corpus of tables, the table including a plurality of columns;
   removing a column comprising incoherent values from the plurality of columns;
   generating two-column tables from remaining columns, the generated two-column tables having a binary relationship between a first column of the two-column table and a second column of the two-column table;
   removing each of the generated two-column tables that has a binary relationship lacking a functional dependency; and
   synthesizing, based on remaining generated two-column tables, at least one mapping table, the at least one mapping table comprising a first column having the functional dependency with a second column.

6. The method of claim 5, wherein removing the column comprising the incoherent values from the plurality of columns comprises:
   determining a coherence score for each column of the plurality of columns; and
   removing the column from the plurality of columns when the coherence score for the column is less than a predetermined threshold.

7. The method of claim 6, wherein the coherence score for each column is determined based on a frequency of occurrence of each item in the column.

8. The method of claim 5, wherein synthesizing the at least one mapping table comprises determining a compatibility score for pairs of the remaining generated two-column tables.

9. The method of claim 8, wherein determining the compatibility score comprises determining a positive compatibility score comprising an overlap between items of the pairs of the remaining generated two-column tables.

10. The method of claim 9, wherein determining the positive compatibility score further comprises determining the overlap between the items of the pairs of the remaining generated two-column tables based on approximate string matching between the items of the pairs.

11. The method of claim 9, further determining a negative compatibility score comprising conflicting items between the pairs of the remaining generated two-column tables.

12. A computer readable storage device including computer readable instructions for synthesizing mapping relationships using a table corpus, which when executed by a processing unit is operative to:
   determine a functional dependency between at least two items of an input table;
   extract a table from a corpus of tables, the table including a plurality of columns;
   remove a column comprising incoherent values from the plurality of columns;
   generate two-column tables from remaining columns, the generated two-column tables having a binary relationship between a first column of the two-column table and a second column of the two-column table;
   remove each of the generated two-column tables that has a binary relationship lacking the functional dependency; and
   synthesize remaining generated two-column tables to determine at least one mapping table, the at least one mapping table comprising a first column having the functional dependency with a second column; and
   provide a next item of the input table from the determined at least one mapping table.

13. The computer readable storage device of claim 12, wherein to remove the column comprising the incoherent values from the plurality of columns, the computer readable instructions when executed by the processing unit is further operative to:
   determine a coherence score for each column of the plurality of columns; and
   remove the column having the coherence score below a predetermined threshold from the plurality of columns.

14. The computer readable storage device of claim 12, wherein to synthesize the remaining generated two-column tables the computer readable instructions when executed by the processing unit is further operative to:
   determine a compatibility score between pairs of the remaining generated two-column tables; and
   merge a first pair of the remaining generated two-column tables based on the determined compatibility score.

15. The computer readable storage device of claim 14, wherein the computer readable instructions when executed by the processing unit is further operative to:
   determine the compatibility score using approximate string matching between values in each column of the pairs of the remaining generated two-column tables.

\* \* \* \* \*